US 6,585,378 B2

(12) United States Patent
Kurtz et al.

(10) Patent No.: US 6,585,378 B2
(45) Date of Patent: Jul. 1, 2003

(54) DIGITAL CINEMA PROJECTOR

(75) Inventors: Andrew F. Kurtz, Rochester, NY (US); Joshua M. Cobb, Victor, NY (US); David Kessler, Rochester, NY (US); Barry D. Silverstein, Rochester, NY (US); Michael E. Harrigan, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/813,207

(22) Filed: Mar. 20, 2001

(65) Prior Publication Data

US 2002/0171809 A1 Nov. 21, 2002

(51) Int. Cl.[7] .................. G03B 21/00; G03B 21/14; G03B 21/26; G02B 27/28; G02B 13/08
(52) U.S. Cl. .............. 353/31; 353/20; 353/34; 353/37; 353/38; 359/489; 359/668
(58) Field of Search .............. 353/20, 31, 33, 353/34, 37, 38, 98, 84; 359/489, 668, 670

(56) References Cited

U.S. PATENT DOCUMENTS

| | | | |
|---|---|---|---|
| 2,391,451 A | 12/1945 | Fischer | 348/773 |
| 2,403,731 A | 7/1946 | MacNeille | 359/488 |
| 2,605,352 A | 7/1952 | Fischer | 348/775 |
| 2,813,146 A | 11/1957 | Glenn | 348/764 |
| 3,084,590 A | 4/1963 | Glenn, Jr. | 359/292 |
| 3,202,039 A | 8/1965 | Lang et al. | 348/265 |
| 4,441,791 A | 4/1984 | Hornbeck | 359/295 |
| 5,383,053 A | 1/1995 | Hegg et al. | 359/486 |
| 5,535,047 A | 7/1996 | Hornbeck | 359/295 |
| 5,555,186 A | 9/1996 | Shioya | 349/9 |
| 5,570,213 A | 10/1996 | Ruiz et al. | 349/116 |
| 5,576,854 A | 11/1996 | Schmidt et al. | 349/5 |
| 5,600,383 A | 2/1997 | Hornbeck | 348/771 |
| 5,620,755 A | 4/1997 | Smith, Jr. et al. | 428/1.21 |
| 5,719,695 A | 2/1998 | Heimbuch | 359/291 |
| 5,748,368 A | 5/1998 | Tamada et al. | 359/486 |
| 5,798,819 A * | 8/1998 | Hattori et al. | 353/33 |
| 5,808,795 A | 9/1998 | Shimomura et al. | 359/488 |
| 5,898,521 A | 4/1999 | Okada | 359/487 |
| 5,912,762 A | 6/1999 | Li et al. | 359/352 |
| 5,914,818 A | 6/1999 | Tejada et al. | 359/663 |
| 5,918,961 A | 7/1999 | Ueda | 353/20 |
| 5,930,050 A | 7/1999 | Dewald | 359/670 |
| 5,969,861 A | 10/1999 | Ueda et al. | 359/488 |
| 6,008,951 A | 12/1999 | Anderson | 359/677 |
| 6,010,121 A | 1/2000 | Lee | 269/94 |
| 6,062,694 A | 5/2000 | Oikawa et al. | 353/31 |
| 6,089,717 A | 7/2000 | Iwai | 353/31 |
| 6,108,131 A | 8/2000 | Hansen et al. | 359/486 |
| 6,122,103 A | 9/2000 | Perkins et al. | 359/486 |
| 6,172,816 B1 * | 1/2001 | Tadic-Galeb et al. | 359/649 |
| 6,208,463 B1 | 3/2001 | Hansen et al. | 359/486 |
| 6,234,634 B1 * | 5/2001 | Hansen et al. | 353/20 |
| 6,243,634 B1 | 5/2001 | Hansen et al. | 701/45 |
| 6,243,199 B1 | 6/2001 | Hansen et al. | 359/486 |
| 6,288,840 B1 | 9/2001 | Perkins et al. | 359/486 |
| 6,310,345 B1 * | 10/2001 | Pittman et al. | 250/334 |
| 6,398,364 B1 * | 6/2002 | Bryars | 353/31 |
| 6,447,120 B1 * | 9/2002 | Hansen et al. | 353/20 |

* cited by examiner

Primary Examiner—Christopher Mahoney
Assistant Examiner—Magda Cruz
(74) Attorney, Agent, or Firm—Nelson Adrian Blish

(57) ABSTRACT

A digital cinema projector (100) for projection of color images onto a display surface comprises a light source (116), which produces a beam of light. Beam-shaping optics (130) homogenize and focus the beam of light and color splitting optics (132) separate focus beam of light into separate color beams. A first modulation optics system comprises a prepolarizer (212), which prepolarizes a first color beam; a wire grid polarization beamsplitter (224), which transmits a first predetermined polarization state of the prepolarized beam; a reflective spatial light modulator (204), which alters the transmitted prepolarized beam with information and reflects the image bearing first color beam through the wire grid polarization beamsplitter (224); and a wire grid polarization analyzer (228), which transmits the image bearing first color beam and attenuates unwanted polarization components. A recombination prism (232) combines the first color beam from the first modulation optical system with other image bearing color beams to create a full color image bearing beam. A projection lens system (150) projects the full color image bearing beam onto the display surface (140).

53 Claims, 10 Drawing Sheets

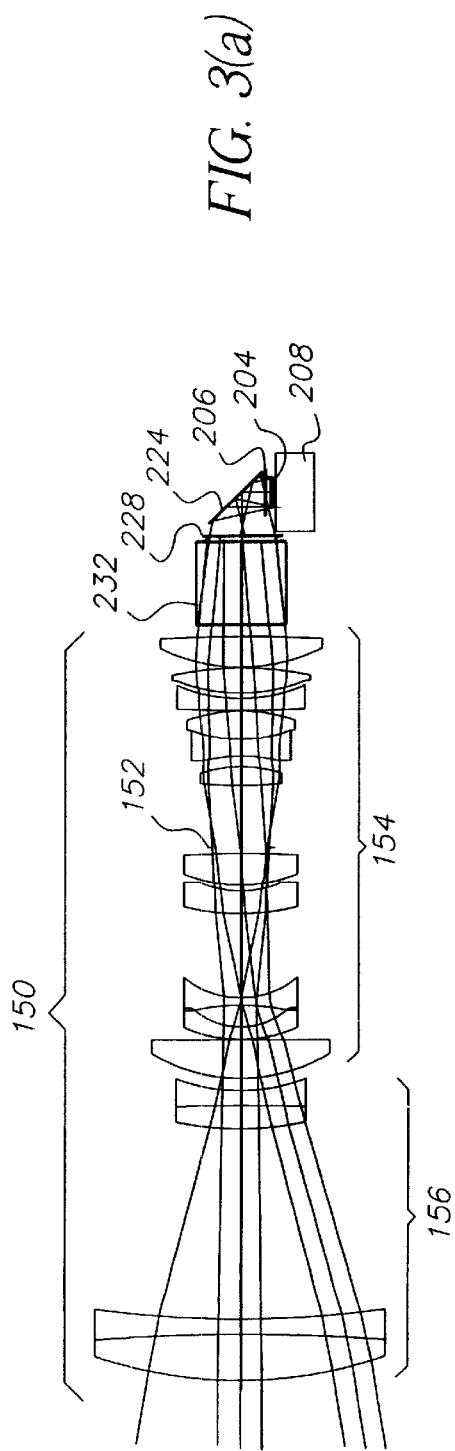
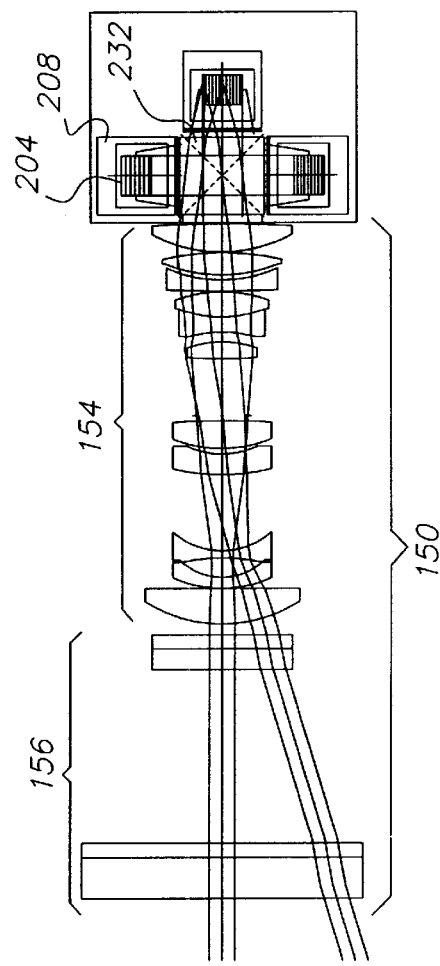
FIG. 3(a)
FIG. 3(b)

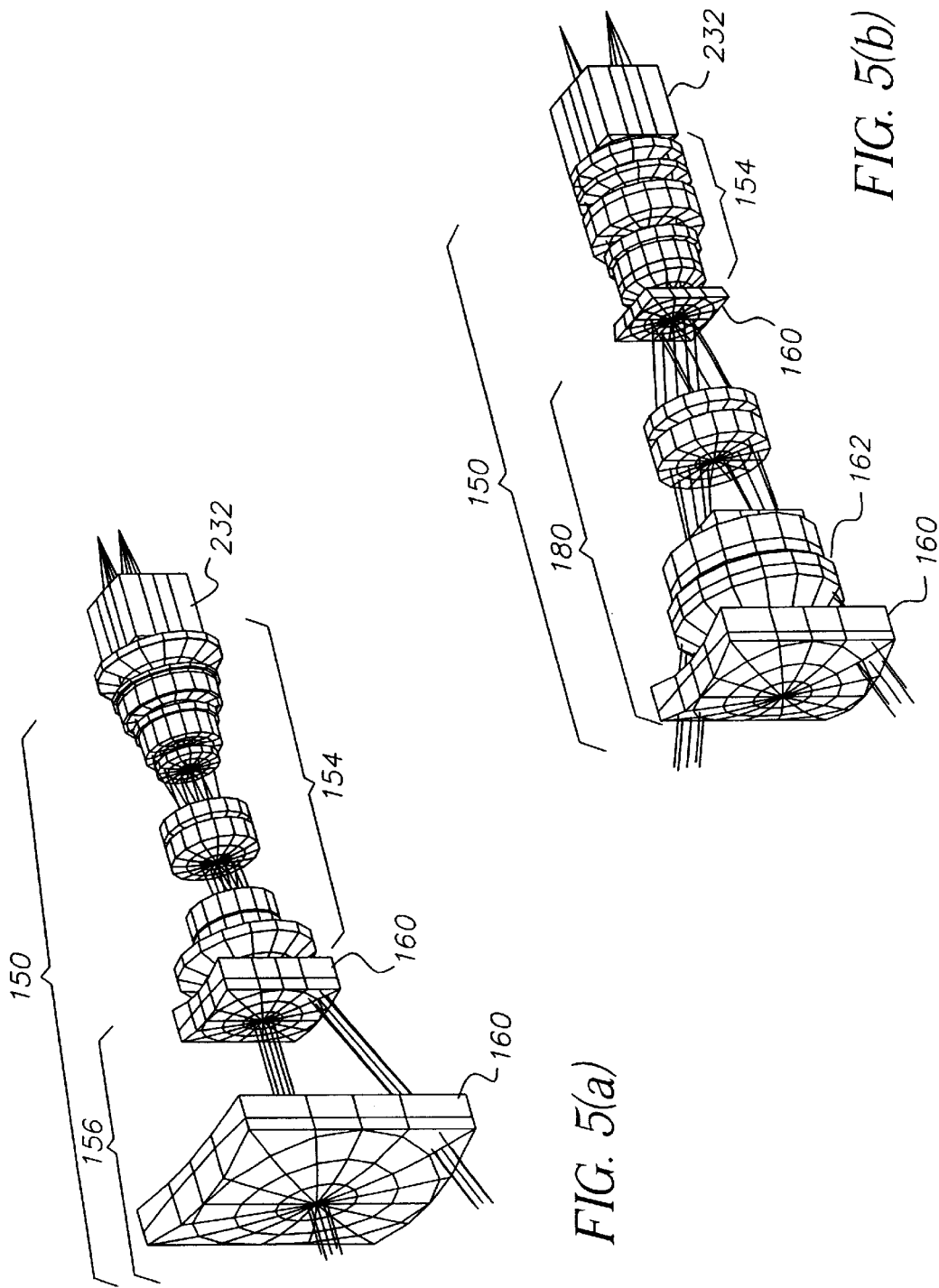

Flat (1.85:1) On Film and Projected

QXGA LCD : 1.33 :1

Scope (2.4:1) Projected

Scope (1.2:1) Squeezed on Film

QXGA LCD : 1.33 :1

DIGITAL CINEMA PROJECTOR

CROSS REFERENCE TO RELATED APPLICATIONS

Reference is made to commonly-assigned copending U.S. patent application Ser. No. 09/799,281, filed Mar. 5, 2001, entitled WIRE GRID POLARIZER, by Kurtz et al., the disclosure of which is incorporated herein.

FIELD OF THE INVENTION

This invention relates in general to a digital cinema and in particular relates to a digital projector using spatial light modulators to form an image on a display screen.

BACKGROUND OF THE INVENTION

Conventional motion picture film projectors have proven successful in projecting quality images that satisfy a viewing audience. In recent decades, the overall cinematic experience has benefited by minor improvements in the quality of presentation. However, the most widely adopted technological improvement is cinema digital sound, rather than any change that improves the quality of the projected image. While the successful commercial development of some select large screen film formats, for example, the IMAX 70 mm format, and the supporting projection equipment has improved image quality, theatres equipped with this equipment are special venues, rather than outlets for traditional Hollywood films. Basically, since the introduction of the 1950's of robust color films and xenon arc lamps, motion picture film projection technology has undergone minor improvements, with few technological breakthroughs.

Although the traditional 35 mm motion picture film system has deficiencies scratches such as dirt, and unsteadiness, which degrade the image quality, overall the system has set high standards for image quality. While the effective screen resolution for 35 mm film projection varies with print quality, 2000 line resolution is generally considered to be sufficient for electronic equivalent systems. Cinematic projection systems also provide a wide color gamut and a large frame sequential contrast ratio (>1,000:1). A large contrast range allows the system to properly render abrupt changes of lightness to darkness, such as may occur at dramatic scene changes. Furthermore, to meet the Society of Motion Picture and Television Engineers (SMPTE) projection standards of 16 ft. L (foot Lamberts) of center screen luminance, a typical cinema projector must provide 8,000 to 15,000 screen lumens, depending on the film format and screen size. Thus, the cinema experience demands very high levels of performance, particularly in comparison to the modern electronic business projector, which need only provide 1500 lumens and 250:1 contrast. Electronic or digital cinema projection systems must satisfy these basic cinematic system requirements, as well as meeting other requirements related to modulator and electronic artifacts, data compression, data security, and system robustness.

The earliest electronic projection system which could project "cinema quality" images without the use of motion picture film was the Eidophor system, which was developed by E. F. Fischer (U.S. Pat. Nos. 2,391,451 and 2,605,352) in the 1940's. The Eidophor used an electron beam to write images onto a reflective oil film. The oil film in turn was illuminated, and then imaged to the screen, through a Schlieren type optical system. An alternate system, called the "Talaria," which was developed in the 1950's by W. Glenn (U.S. Pat. Nos. 2,813,146 and 3,084,590) of General Electric, was similar to the Eidophor, except that it used transmissive, rather than reflective, oil films. Although both of these systems were successful in their own right, and were used successfully in cinematic projection demonstrations, neither had significant impact on the motion picture film projection industry.

Commercially available electronic projection systems are constrained by limited performance, particularly with respect to resolution, light efficiency, and contrast ratio. Typical systems, include those available from manufacturers such as JVC; Barco, headquartered in Ghent, Belgium; Christie Digital Systems, Inc., Kitchener, Ontario, Canada; and In Focus Corporation, Wilsonville, Oreg., among others. In general, these systems output between 500 and 3000 lumens and provide screen contrast ratios ranging from 100:1 to 400:1. These limitations constrain the use of such projection systems to home projection, business, concert, control room, and image simulation functions.

Recently there have been many proposals and technology demonstrations of alternate approaches to cinema. These approaches have ranged from proposed new film formats, to 3-D imaging or immersion systems, and to electronic display system. Most notably, Texas Instruments Inc. of Dallas, Tex., and Victor Company of Japan, Ltd. (JVC), or Yokohama, Japan, have publicly exhibited prototype electronic projection systems as candidates to replace 35 mm film in providing commercial quality cinema projection. While these prototype systems showed substantial merit, they have not yet matched or exceeded all the on-screen image quality and system flexibility standards set by the conventional film-based projection system. In particular, there are opportunities for improvement with respect to image resolution, pixelization, image contrast, color reproduction, and brightness needed to obtain the expected "look and feel" of film.

The most promising solutions for digital cinema projection employ, as image forming devices, one of two types of spatial light modulators, either a digital micro-mirror device (DMD) or a liquid-crystal device (LCD). Texas Instruments has demonstrated prototype projectors using one or more DMDs. DMD devices are described in a number of patents, for example, U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Pat. Nos. 5,914,818 (Tejada et al.); 5,930,050 (Dewald); 6,008,951 (Anderson); and 6,089,717 (Iwai). While DMD-based projectors demonstrate some capability to provide the necessary light throughput, contrast ratio, and color gamut, inherent resolution limitations (current devices providing only 1024×768 pixels), high component and system costs have restricted DMD acceptability for high-quality digital cinema projection.

Alternatively, LCD devices appear to have advantages as spatial light modulators for high-quality digital cinema projection systems. Recently, JVC publicly demonstrated a LCD-based projector capable of high-resolution (providing 2,000×1280 pixels), high frame sequential contrast in excess of 1000:1, and high light throughput (nominally, up to 12,000 lumens). This system utilized three vertically aligned LCDs (one per color) driven or addressed by cathode ray tubes (CRTs). While this system demonstrated the potential for an LCD based digital cinema projector, the system complexity, reliability, and cost are not well suited for commercial production. More recently, JVC has developed a new family of vertically aligned LCDs, which are addressed via a silicon backplane rather than by CRTs, although these new devices have not yet been used in digital cinema presentation. The JVC LCD devices are described, in part, in U.S. Pat. No. 5,570,213 (Ruiz et al.) and U.S. Pat. No. 5,620,755 (Smith, Jr. et al.). In contrast to early twisted nematic or cholesteric LCDs, vertically aligned LCDs potentially provide much higher modulation contrast ratios, in excess of 2,000:1. It is instructive to note that, in order to obtain on screen frame sequential contrast of 1,000:1 or better, the entire system must produce >1000:1 contrast, and both the LCDs and the polarization optics must each separately provide ~2,000:1 contrast.

Obviously, the optical performance provided by LCD based electronic projection system is in large part defined by the qualities of the polarization optics and the LCDs. However, numerous other components, including the lamp source, light integration optics, the polarization converter, color filters and prisms, and waveplates also significantly impact performance. For example, as electronic projection systems modulate each red, green, and blue (R, G, B) color component separately, these systems also require color splitting and color recombination optics, including dichroic filters and color prisms, such as the familiar X-prism, commonly used for recombination. Thus, the relative success of an optical design for an electronic projection system is largely determined by the packaging and performance provided from the imaging sub-system, which includes modulator arrays, beam splitting optics, and a projection lens.

Among examples of electronic projection apparatus that utilize LCD spatial light modulators are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,121 (Maki et al.); and U.S. Pat. No. 6,062,694 (Oikawa et al.). Each of these example devices employ an arrangement of color splitting dichroic components to separate R, G, B light to their respective channels for modulation. One or more separate LCDs are then used for modulation within each channel. An X-prism then provides RGB color recombination. Polarization beamsplitters are used to selectively direct polarized light within each color channel. Performance is enhanced using low-stress beamsplitter designs, with specialized polarization beamsplitters used for each color channel. In the above patents, various solutions are disclosed to address a range of problems, including mounting methods to minimize thermally induced stress, symmetrical designs to minimize contrast and color shading, compact designs which limit the overall projector size, and the addition of optics for manipulating polarization states in order to maximize brightness, for example.

As is clearly shown in the above patents, polarization separation optics, such as polarization beamsplitters, are key components for determining the overall optical performance of electronic projection apparatus. In order to provide the level of contrast necessary for this application, a polarization beamsplitter must provide a high extinction ratio between modulated and un-modulated light. The polarization beamsplitter must also be able to meet the demands placed on the system for brightness. However, existing polarization beamsplitters have not been shown to provide the performance necessary for successful commercial use with high-quality digital cinema projects. In particular, typical polarization beamsplitters do not perform equally well at all wavelengths across the visible spectrum, resulting in undesirable color shading and contrast effects under some conditions. Likewise, conventional polarization beamsplitter devices also suffer from reduced performance versus incidence angle (that is, limited numerical aperture), which in turn effects the capability of attaining desired screen brightness levels.

The most common conventional polarization beamsplitter solution, which is used in many projection systems, is the traditional MacNeille prism, disclosed in U.S. Pat. No. 2,403,731. This device has been shown to provide a good extinction ratio (on the order of 300:1). However, this standard prism operates only over a limited range of angles (a few degrees). Because the MacNeille prism design provides good extinction ratio for one polarization state only, a design using this device must effectively discard half of the incoming light when this light is from an unpolarized white light source, such as from a xenon or metal halide arc lamp.

Conventional glass polarization beamsplitter designs, based on the MacNeille design, have other limitations beyond the limited angular response, which could impede its use for digital cinema projection. In particular, bonding techniques used in fabrication or thermal stress in operation, can cause stress birefringence, in turn degrading the polarization contrast performance of the beamsplitter. These effects, which are often unacceptable for mid-range electronic projection applications, are not tolerable for cinema projection applications. The thermal stress problem has recently been improved upon, with the use of a more suitable low photo-elasticity optical glass, disclosed in U.S. Pat. No. 5,969,861 (Ueda et al.), which was specially designed for use in polarization components. Unfortunately, high fabrication costs and uncertain availability limit the utility of this solution. Furthermore, while it would be feasible to custom melt low-stress glass prisms suited to each wavelength band in order to minimize stress birefringence, while somewhat expanding angular performance, such a solution is costly and error-prone. As a result of these problems, the conventional MacNeille based glass beamsplitter design, which is capable of the necessary performance for low to mid-range electronic projection systems, operating at 500–2,000 lumens with approximately 300:1 contrast, falls short of the more demanding requirements of full-scale commercial digital cinema projection.

Certainly, other polarization beamsplitter technologies have been proposed to meet the needs of an LCD based digital cinema projection system. For example, the beamsplitter disclosed in U.S. Pat. No. 5,912,962 (Li et al.), which comprises a plurality of thin film layers sandwiched between two dove prisms attempts to achieve high extinction ratios for both polarization states. Theoretically, the beamsplitter device disclosed in the Li et al. patent is capable of extinction ratios in excess of 2,000:1. When designed into a projection system with six LCDs (two per color), such a prism could boost system efficiency by allowing use of both polarizations for image projection. However, size constraints and difficulties in prism manufacture present obstacles to commercialization of a projection apparatus using this beamsplitter design.

As another conventional solution, some projector designs have employed liquid-immersion polarization beamsplitters. Liquid-filled beamsplitters have been shown to provide high extinction ratios needed for high-contrast applications and have some advantages under high-intensity light conditions. These devices, however, are costly to manufacture, and must be fabricated without dust or contained bubbles. Under conditions of steady use, they have exhibited a number of inherent disadvantages. Among the disadvantages of liquid-immersion polarization beamsplitters are variations in refractive index of the liquid due to temperature, including uneven index distribution due to convection. Leakage risk presents another potential disadvantage for these devices.

Wire grid polarizers have been in existence for a number of years, primarily used in radio-frequency applications and in optical applications using non-visible light sources. Use of wire grid polarizers with light in the visible spectrum has been limited, largely due to constraints of device performance or manufacture. For example, U.S. Pat. No. 5,383,053 (Hegg et al.) discloses use of a wire grid beamsplitter in a virtual image display apparatus where, notably, there is no requirement for high extinction ratio. In the Hegg et al. disclosure, an inexpensive wire grid beamsplitter is used as an efficient alternative, providing high light throughput when compared against conventional, glass-based beamsplitters. A second wire grid polarizer for the visible spectrum is disclosed in U.S. Pat. No. 5,748,368 (Tamada). While the device discussed in this patent provides polarization separation, the contrast ratio is inadequate for cinematic projection and the design is inherently limited to rather narrow wavelength bands.

Recently, as disclosed in U.S. Pat. No. 6,122,103 (Perkins et al.), higher quality wire grid polarizers and beamsplitters have been developed for broadband use in the visible spectrum. Among these are new devices commercially available from Moxtek Inc of Orem, Utah. While existing wire grid polarizers, including the devices described in U.S. Pat. No. 6,122,103, may not exhibit all of the necessary performance characteristics needed for obtaining the high contrast required for digital cinema projection, these devices do have a number of advantages. When compared against standard polarizers, wire grid polarization devices exhibit relatively high extinction ratios and high efficiency. Additionally, the contrast performance of these wire grid devices also has broader angular acceptance (NA or numerical aperture) and more robust thermal performance, with less opportunity for thermally induced stress birefringence than standard polarization devices. Furthermore, the wire grid polarizers are robust relative to harsh environment conditions, such as light intensity, temperature, and vibration. These devices perform well under conditions of different color channels, with the exception that response within the blue light channel may require additional compensation.

However, wire grid polarizers have not been satisfactorily proven to meet all of the demanding requirements imposed by digital cinema projection apparatus. Deficiencies in substrate flatness, in overall polarization performance, and in robustness at both room ambient and high load conditions have limited commercialization of wire grid polarization devices for cinematic projection. Furthermore, neither the wire grid polarizer, nor the wire grid polarization beamsplitter, provide the target polarization extinction ratio performance (nominally>2,000:1) to achieve the desired projection system frame sequential contrast of 1,000:1 or better. Individually, both of these components provide less than 1,000:1 contrast under best conditions. Performance falls off further in the blue spectrum. Finally, the problems of designing an optimized configuration of polarization optics, including wire grid polarizers, in combination with the LCDs, color optics, and projection lens, have not been addressed either for electronic projection generally, or for digital cinema projection in particular. Thus, it can be seen that, while there are conventional approaches for digital cinema projection apparatus design, there is a need for an improved projection apparatus that uses the advantages of wire grid polarization beamsplitters to provide high-quality motion picture projection output.

SUMMARY OF THE INVENTION

It is an object of the present invention to provide a digital cinema projector for imaging of sequential color image frames onto a display surface.

Briefly, according to one aspect of the present invention, a digital cinema projector for projection of color images onto a display surface comprises a light source, which produces a beam of light. Beam-shaping optics homogenize and focus the beam of light and color splitting optics separate focus beam of light into separate color beams. A first modulation optics system comprises a prepolarizer, which prepolarizes a first color beam; a wire grid polarization beamsplitter, which transmits a first predetermined polarization state of the prepolarized beam; a reflective spatial light modulator, which alters the transmitted prepolarized beam with information and reflects the image bearing first color beam through the wire grid polarization beamsplitter, and a wire grid polarization analyzer, which transmits the image bearing first color beam and attenuates unwanted polarization components. A recombination prism combines the first color beam from the first modulation optical system with other image bearing color beams to create a full color image bearing beam. A projection lens system projects the full color image bearing beam onto the display surface.

It is a feature of the present invention that it employs a wire grid polarization beamsplitter within a digital cinema projector.

It is an advantage of the present invention that it provides a lightweight projection apparatus when contrasted against conventional digital cinema projector.

It is a further advantage of the present invention that it provides a robust solution for digital cinema projection, with reduced effects due to thermal stress when contrasted against conventional digital cinema projectors.

It is a further advantage of the present invention that it provides a high-performance digital cinema projector, with suitable light throughput, high contrast, and high resolution, with excellent color gamut performance.

It is a further advantage of the present invention that it offers the opportunity to fabricate a digital cinema projector that is lighter and more compact than existing equipment.

It is a further advantage of the present invention that it provides a digital cinema projection apparatus having minimum artifacts such as color shading, contrast shading, and flare light.

These and other objects, features, and advantages of the present invention will become more apparent to those skilled in the art upon reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 3a and 3b are cross sectional top and side views showing a modulation optical system, recombination prism, and projection lens system of the digital cinema projector according to the present invention;

FIG. 5a is a perspective view showing the projection lens system in a preferred embodiment of the present invention;

FIG. 5b is a perspective view showing an alternate projection lens system;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
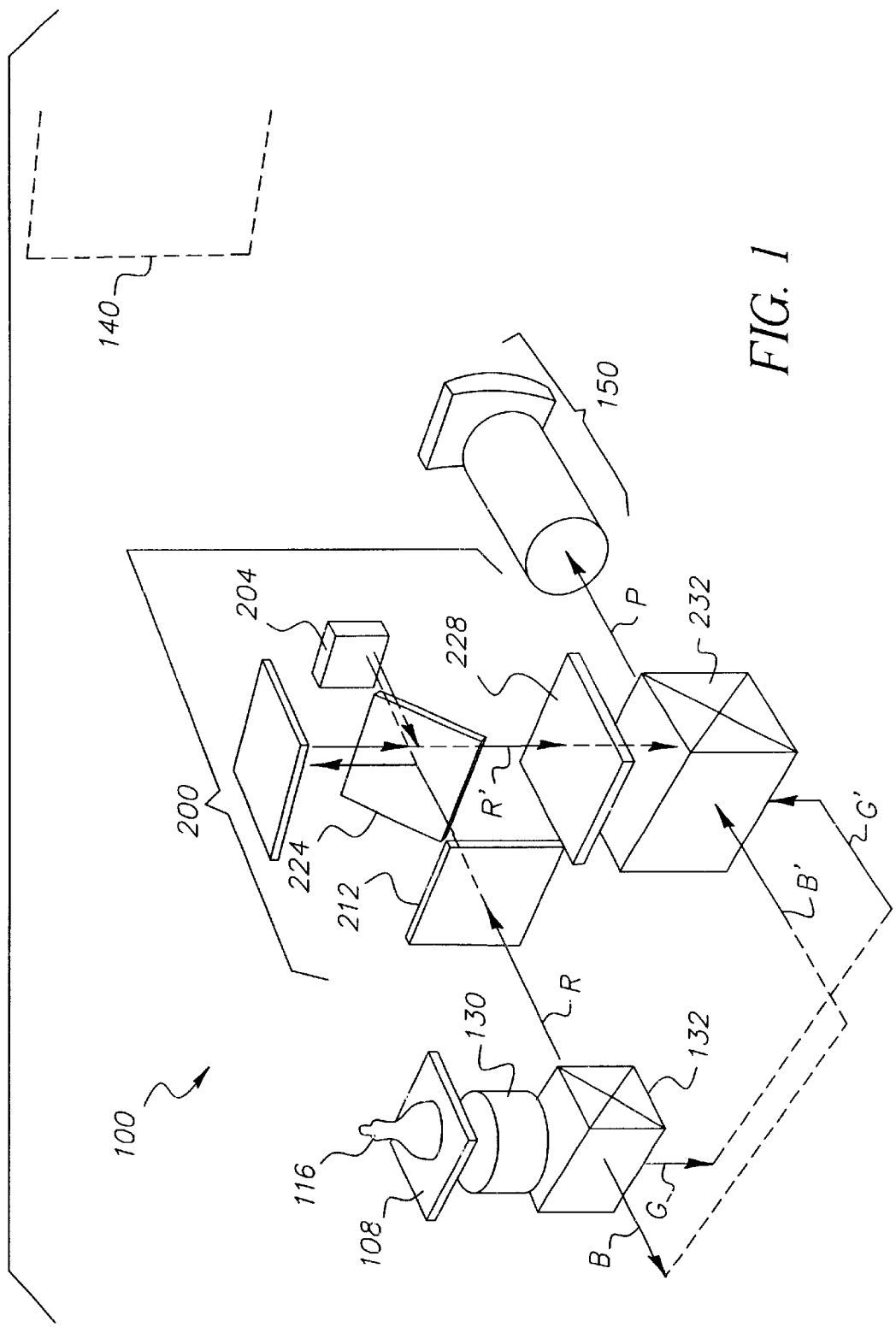
FIG. 1 is a perspective view showing a digital cinema projector according to the present invention.

Referring to FIG. 1, there is shown a perspective view of a digital cinema projector 100 according to the present invention. Digital cinema projector 10 comprises a light source 116, which may be provided with an optional filter 108 for IR and UV attenuation. Digital cinema projector 100 also comprises beam-shaping optics 130 for homogenizing and focusing the output of light source 116. Color-splitting optics 132 separates the light into three primary color components, a Red beam R, a Green beam G, and a Blue beam B. For each R, G, and B color beam, a modulation optical system 200 is disposed, to process the R, G, or B color beam and provide a modulated color beam, R', G', or B'. FIG. 1 shows modulation optical system 200 for the Red beam only; identical structures are used for Green and Blue beams. A recombination prism 232 (also known as an x-prism) accepts and recombines the modulated color beams R', G', and B' to provide combined output beam P for projection onto a display screen 140 (indicated in a dotted line in FIG. 1) by a projection lens system 150.

Figure 2:
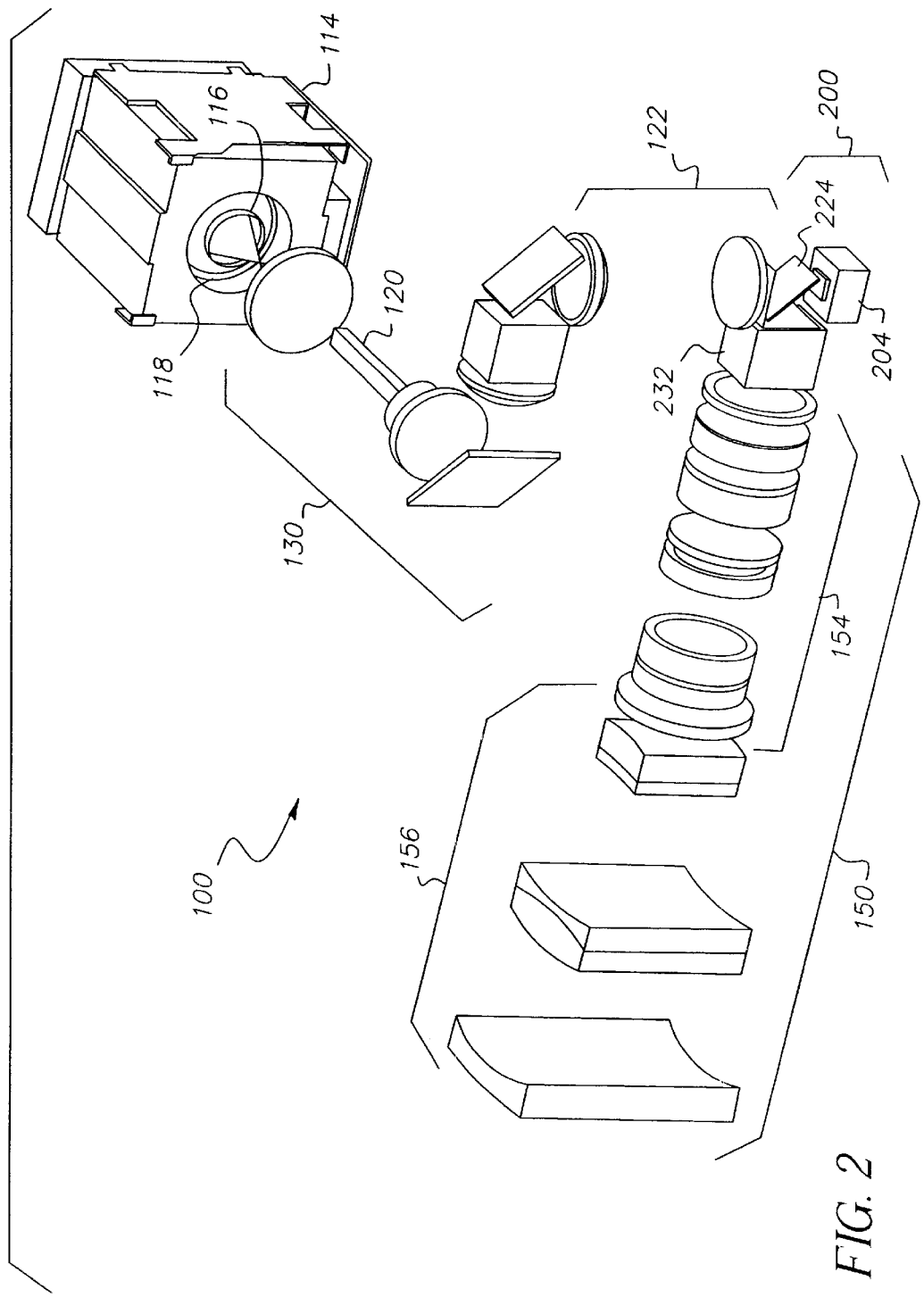
FIG. 2 is a perspective view showing a modulation optical system for a single color in a digital cinema projector according to the present invention.

Referring to FIG. 2, there is shown a perspective view of digital cinema projector 100 with a more detailed depiction of beam-shaping optics 130 and projection lens system 150, but with color-splitting optics 132 omitted for clarity. Light source 116 is typically an arc lamp, such as a Xenon arc lamp, or other bright light source. Supporting components for light source 116 include a lamphouse 114 in which a reflector 118 is mounted. In the preferred embodiment, beam-shaping optics 130 comprise a light integrator 120, such as an integrating bar, for uniformizing the light from light source 116. A fly's eye system could alternately be used as light integrator 120. A condensor 122 provides focus and uniform illumination. Color-splitting optics 132 (see FIG. 1) may include one or more dichroic beamsplitters or dichroic filters, using techniques well-known in the digital projection arts is discussed in more detail below and in conjunction with FIGS. 5a and 5b.

It must be noted that the arrangement of beam-shaping optics 130 and color-splitting optics 132 of FIGS. 1 and 2 allows a number of variations, as is well known in the digital projection arts. For example, it may prove more effective to split the light into R, G, and B beams before performing beam-shaping and light integration functions.

Figure 4A:
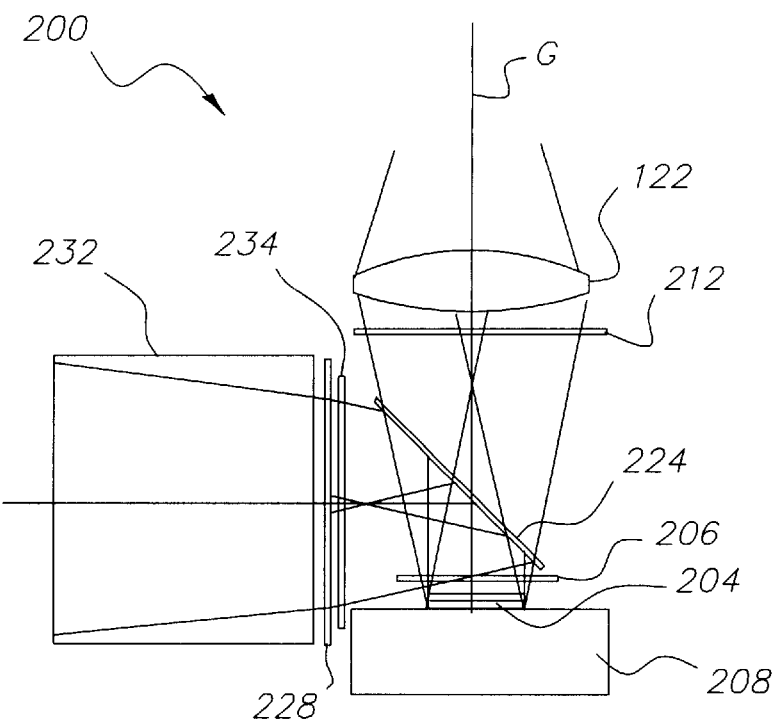
FIG. 4A is an enlarged side view showing a wire grid polarization beamsplitter and key polarization support components.

Referring again to FIG. 1, modulation optical system 200 provides the optical components necessary to obtain the desired polarization of input light, the modulation of the light for imaging, and to determine the final polarization of the imaging beam. Modulation optical system 200 comprises a prepolarizer 212, a polarization beamsplitter 224, an optional compensator 206 (shown in FIG. 4), a spatial light modulator 204, and a polarization analyzer 228. Prepolarizer 212 is a wire grid polarizer in the preferred embodiment of the present invention. Prepolarizer 212 provides an initial polarization for the R, G, or B color beam. A suitable prepolarizer 212 is manufactured by Moxtek, Inc., Orem, Utah. The Moxtek wire grid polarizer transmits incident "p" polarized light with a high contrast ratio (~50–400:1, depending on wavelength), while it reflects incident "s" polarized light with low contrast (~10:1). Fortunately, the polarization response changes only slightly with angle of incidence, providing nearly the same performance at f/2.5 as it does on axis.

Wire grid polarization beamsplitter 224 is disposed to reflect incident light having the desired polarization state (s- or p-polarization) onto spatial light modulator 204. Spatial light modulator 204, in the embodiment shown, is a two-dimensional, reflective polarization-based spatial light modulator. The preferred embodiment employs a Liquid-Crystal Device or LCD modulator, although other polarization modulators could be used. As is well known in the electronic imaging arts, an LCD modulator operates by selectively rotating the polarization state of incident light at each point within an array of pixel locations. The definition of "on" and "off" states depends on the orientation of the polarizers and of the LCDs. Typically, if light throughput or brightness is of greatest priority, the "off" state of the device (providing no power to the pixels) will be aligned with the open gate position of the polarizers, so that light reaches the target plane. If, on the other hand, modulation contrast is of greater importance, then the "off" state of the device will be aligned with the "off" state of the polarizers (polarizers are crossed), such that minimal light reaches the target plane.

In the case of digital cinema, where more light can conceivably be added with a larger lamp or more efficient optical design, the polarizers are crossed, so that the LCDs "off" state corresponds to a dark screen, and system contrast is maximized. The digital cinema projection system of FIGS. 1 and 2 is designed to deliver both high system contrast (>1,000:1), high brightness (10,000 lumens nominal), and high resolution images. To simultaneously meet these challenging, and somewhat conflicting requirements, the LCD modulator must be relatively large (1.3" diagonal or greater), have high contrast modulation performance (nominally >2,000:1 for all three colors), and provide high resolution (>2 Mpixels). At present, among the numerous LCD constructions, including twisted nematic, smectic, and cholesteric, the vertically aligned twisted nematic LCD modulator is the only one capable of providing the required modulation contrast. Although, at the present time, several LCD manufacturers fabricate vertically aligned twisted nematic LCDs (such as Three-Five Systems, Inc., Tempe, Ariz.; and Philips Electronics N.V.), only JVC provides commercially available vertically aligned devices having the required size (1.3") and pixel count (QXGA format with 2048×1536 pixels). Therefore, in a preferred embodiment, the digital cinema projector of the present invention employs reflective liquid-crystal-on-silicon JVC QXGA LCDs, having both the advantages and disadvantages of these devices.

From an optical standpoint, it would be preferable to design digital cinema projector 100 utilizing one or more transmissive modulators, rather than designing a system using reflective LCD modulators. The resulting optical design would presumably be both simpler and more compact, and potentially be more efficient as well. Unfortunately, neither a transmissive electro-optic nor micro-opto-mechanical (MEMS) modulator technology has yet been developed having the necessary performance for either a cinematic or video rate projection system.

Figure 4B:
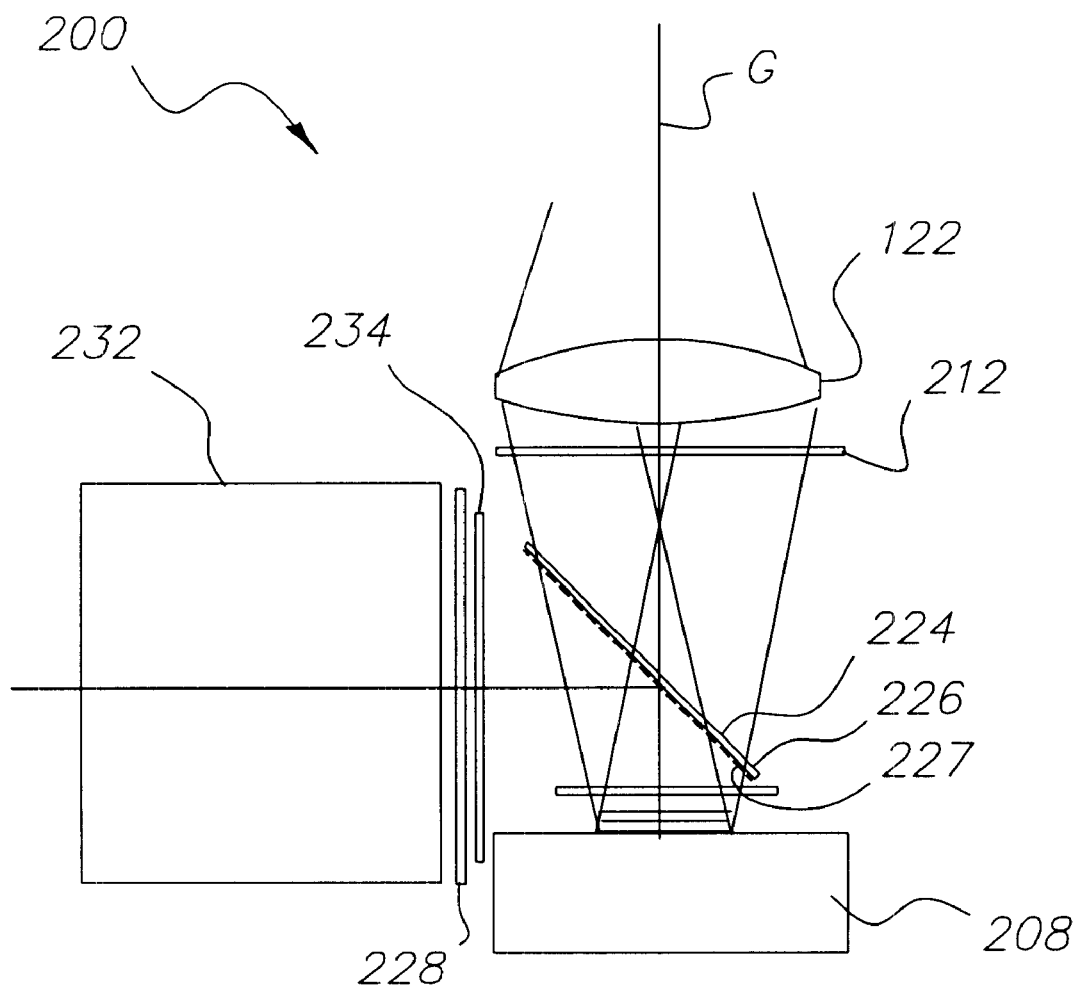
FIG. 4b is an enlarged side view showing a wire grid polarization beamsplitter with subwavelength wires facing the spatial light modulator.

FIG. 4 shows the preferred relationships of the various key components within the modulation optical system 200 in greater detail. The incoming illumination light beam G (a Green beam, for example) is focused through prepolarizer 212, wire grid polarization beamsplitter 224, compensator 206, and onto spatial light modulator 204 (the LCD) by a condensor 122. Spatial light modulator 204 is packaged within spatial light modulator assembly 208, which includes mounting features, a cover glass, and heat sink (all not shown). Condensor 122, which will likely comprise several lens elements, images the output face of light integrator 120 (shown in FIG. 2) onto the active area of spatial light modulator array 204. The modulated, image-bearing light beam reflected from the surface of spatial light modulator 204, is transmitted through compensator 206, is then reflected off the near surface of wire grid polarization beamsplitter 224, is next transmitted through an optional color tuning waveplate 234, a polarization analyzer 228, and recombination prism 232. Thereafter, the image bearing light is projected onto screen 140 (not shown in FIG. 4) by projection lens system 150 (shown in FIGS. 1 and 2). As noted, in the preferred embodiment, wire grid polarization beamsplitter 224 is disposed for reflection into projection lens system 150, thereby avoiding the well known astigmatism and coma aberrations induced by transmission through a tilted plate. These wire grid devices (whether polarizers or polarization beamsplitter) consist of a parallel array of sub-wavelength wires fabricated on a glass substrate, which is typically a thin slab of optical plate glass.

As stated previously, in order for digital cinema projector 100 to provide 1,000:1 contrast, the polarization optical components, excluding spatial light modulator 204 (the LCD) of modulation optical system 200 must provide ~2,000:1 contrast. The actual target contrast for the polarization optics does depend on the performance of the LCDs. Thus, if for example, the LCDs provide ~1500:1 contrast, then the polarization optics must provide 3,000:1 contrast. Typically, the contrast performance of both the LCDs and the polarization optics decreases with increasing numerical aperture of the incident beam. Unfortunately, it is not sufficient to use just a single wire grid polarization beamsplitter 224 by itself in order to meet the 2,000:1 target contrast for the polarization optics. For this reason, prepolarizer 212 and polarization analyzer 228 are both provided as polarization support components within modulation optical system 200.

Figure 7A:
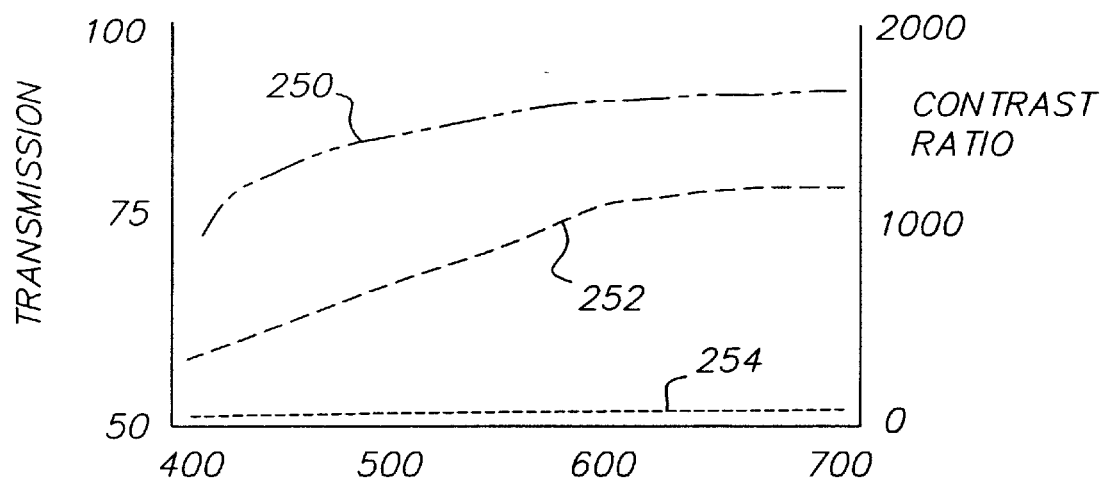
FIGS. 7a and 7b are graphic plots illustrating the relative performance of wire grid polarizers and polarization beamsplitters designed to operate with the visible spectrum.

Typical optical performance of a commercially available Moxtek wire grid polarization beamsplitter is shown in FIG. 7a, as measured across the visible spectrum for a light beam incident at 45° with a modest NA. In particular, FIG. 7a illustrates a wire grid polarization beamsplitter transmission efficiency (Tp) curve 250 and a wire grid polarization beamsplitter transmitted contrast ratio (Tp/Ts) curve 252, which indicates that the angle averaged polarization contrast ratio of using this wire grid device at 550 nm in transmission is ~800:1. However, as illustrated by a wire grid polarization beamsplitter reflected contrast ratio curve 254 of FIG. 7a, the polarization extinction ratio of this beamsplitter when used in reflection at 550 nm is only ~30:1. Taken together, with wire grid polarization beamsplitter used in transmission as a prepolarizer to the incident illumination beam G, and then as an analyzer working in reflection on the outgoing imaged light, the combined extinction (if the LCD were perfect) is only ~29:1. This clearly does not meet the 2,000:1 target. As a result, modulation optical system 200 requires additional polarizer optics to boost performance. In particular, polarization analyzer 228 and prepolarizer 212 can be included. Although prepolarizer 212 could be polarization beamsplitting cube, this device is preferentially a wire grid polarizer, such as is commercially available from Moxtek, Inc.

Figure 7B:
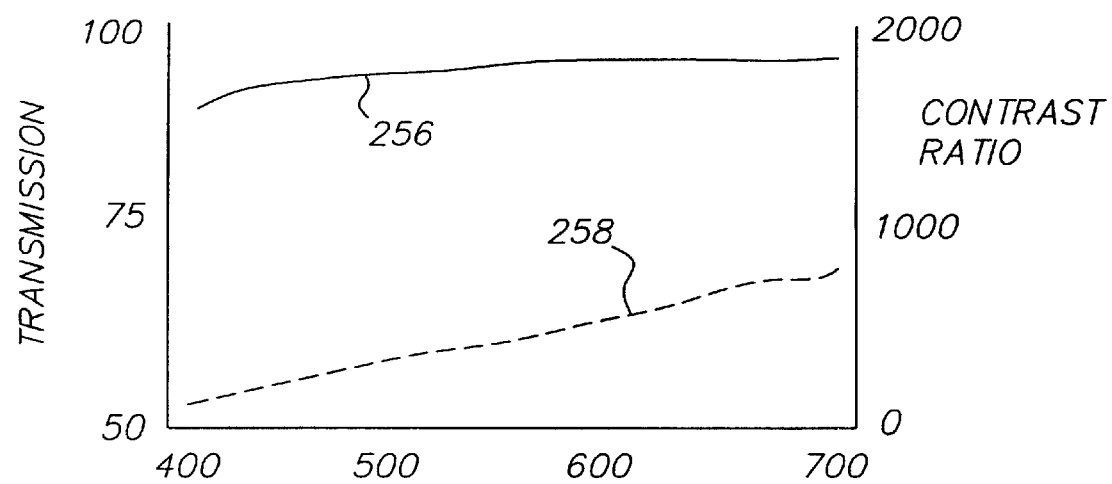

FIG. 7b illustrates a wire grid polarizer transmission efficiency curve 256 and a wire grid polarizer contrast ratio curve 258 across the visible spectrum for prepolarizer 212. With green light, at 550 nm, wire grid prepolarizer 212 has an angle averaged polarization contrast ratio of ~250:1. When used in combination, wire grid polarization beamsplitter 224 and wire grid prepolarizer 212 produce a contrast ratio of ~25:1, which still falls short of the system requirements. Thus, the polarization performance of overall modulation optical system 200 is also supported with the addition of polarization analyzer 228, which is preferably a wire grid polarizer, and is nominally assumed to be identical to wire grid polarizer 212. Polarization analyzer 228 removes the leakage of light which is other than the preferred polarization state. Thus, the overall contrast for green light, directed through modulation optical system 200 in its entirety, is boosted to ~2,900:1, which meets specification. Preferentially, wire grid polarization beamsplitter 224 is oriented with the surface with the sub-wavelength wire structure facing towards the spatial light modulator 204, rather than towards the beam shaping optics 130. As a result, the polarization performance of modulation optical system 200 is maximized, and the system is also desensitized to thermal stress effects.

The preferred configuration of modulation optical system 200, with the incident illuminating light beam G being transmitted through prepolarizer 212 and wire grid polarization beamsplitter 224, so that the subsequently modulated image bearing light beam then first reflects off the LCD (spatial light modulator 204), and then secondly reflects off wire grid polarization beamsplitter 224, before entering polarization analyzer 228 and projection lens system 150, has advantages other than just providing the desired polarization contrast of ~2,000:1. Mainly, by having the image bearing beam reflect off wire grid polarization beamsplitter 224, rather than be transmitted through it, the digital cinema projector 100 is desensitized to thermally induced stress birefringence effects within the glass substrate of wire grid polarization beamsplitter 224. As opposed to electronic projection systems with conventional glass prisms, where the polarized light transits the prism twice (in illumination and imaging), in this case light is transmitted through polarization beamsplitter just once, and the second interaction is a surface interaction. To gain this benefit, wire grid polarization beamsplitter 224 is preferentially arranged with the glass substrate 226 facing the prepolarizer 212 and the sub-wavelength wires 227 facing spatial light modulator 204. This arrangement is shown for clarity in FIG. 4a. Thermally induced stress birefringence effects are also reduced relative to the standard glass polarization prisms, because the amount of glass comprising the polarizer substrate is significantly reduced.

Returning again to FIGS. 7a and 7b, which provide the polarization contrast ratios and transmission curves of the commercially available wire grid polarization beamsplitters and wire grid polarizers, red color channel performance is observed to be significantly better than that for the green color channel. Indeed, at 650 nm the Moxtek wire grid polarization beamsplitter provides a contrast ratio in reflection of ~1200:1, while the Moxtek wire grid polarizer provides ~350:1. However, again the low contrast reflection from the Moxtek wire grid polarization beamsplitter (at ~50:1 at 650 nm) reduces the combined contrast (to ~39:1). Thus, as in the green channel, the red channel requires an added polarization component, preferably wire grid polarization analyzer 228, to boost the contrast ratio. When wire grid polarization analyzer 228 is included, the overall red contrast improves to ~7,000:1. Thus, when an exemplary configuration of polarization components, including a pre-polarizer 212 (preferably a wire grid polarizer), a wire grid polarization beamsplitter 224, and a polarization analyzer 228 (also preferably a wire grid polarizer) are used in combination, polarization contrast ratios exceeding 2,000:1 in the green and red can be obtained, thereby meeting the system specification.

Again considering FIGS. 7a and 7b, which provide the polarization contrast ratios and transmission curves of the commercially available wire grid polarization beamsplitters and wire grid polarizers, the blue color channel performance is observed to be significantly worse than that of the green color channel. Indeed, when the polarization contrast performance for modulation optical system 200 is calculated, assuming both a perfect LCD modulator and the polarization optics configuration of FIG. 4 (with wire grid prepolarizer 212 and analyzers 228 used in transmission, and with wire grid polarization beamsplitter 224 used first in transmission for illumination and then in reflection for imaging), then the expected blue contrast at 450 nm is only ~900:1. Thus, the contrast ratio in the blue fails to meet the target specification of 2,000:1, although the color averaged frame sequential contrast does exceed the ~2,000:1 target for the polarization optics, and the ~1,000:1 target for the entire system, including the spatial light modulators (LCDs) 204. Fortunately, some reduction in contrast is considered acceptable in the blue channel, as human perception is comparatively less sensitive to blue detail information than it is to green or red detail information. It is generally true that the commercially available polarization devices, including the Moxtek wire grid polarization devices whose performance is provided in FIGS. 7a and 7b, are blue-limited, so that response to blue light is somewhat below target contrast levels. Optimally, polarization devices with better blue response would be preferable, to boost the blue channel contrast, and also to simplify the system.

In the prior discussion of polarization contrast ratios, it was assumed that spatial light modulator 204, preferably a vertically aligned twisted nematic LCD, provided perfect contrast modulation performance, as if this device were a mirror. However, this is of course not the case. FIG. 4, which provides a cutaway side view of modulation optical system 200, includes compensator 206 disposed between spatial light modulator 204 and wire grid polarization beamsplitter 224. Compensator 206 is nominally a waveplate which provides a small amount of retardance needed to compensate for geometrical imperfections and birefringence effects which originate at the surface of spatial light modulator 204. As is disclosed in U.S. Pat. No. 5,576,854 (Schmidt et al.), LCD devices used for projection can employ ~0.02 waves of retardance to compensate for skew ray leakage and residual birefringence variations, thereby improving contrast. Furthermore, compensator 206 is preferably optimized for a given color. It has been demonstrated that the modulation contrast of an LCD without a matched wave plate may only be ~500:1, while, with a properly matched wave plate, it can achieve nearly ~40,000:1 modulation contrast (for collimated light). On the otherhand, as wire grid polarization beamsplitter 224 has functional properties which are different from those of the typical polarization beamsplitting cube, the design of modulation optical system 200 is further differentiated from that of similar system with a polarizing cube. Wire grid polarization beamsplitter has a wide angular acceptance it also defines the polarization states ("s" and "p") of the outgoing light relative to its own geometry (that is, the orientation of the sub-wavelength wire structure), without causing rotation of the transmitted skew ray polarization vectors. As a result, the wire grid polarization beam splitter imposes much less geometrically induced polarization errors as compared to a polarizing beam splitting cube, which functions by rotating the polarization states of the incident light, rather than defining them. Typically, electronic projection systems employing polarization beam splitting cubes also employ a quarter waveplate to compensate for these errors, thereby increasing polarization contrast. Thus, for example, the prior art system of Schmidt et al. provides a waveplate with 0.27 waves total retardance, comprising 0.02 waves of LCD correction and 0.25 waves of polarization prism correction. By comparison, when modulation optical system 200 includes wire grid polarization beamsplitter 224, polarization contrast in the red exceeds 2,000:1 when used without a quarter waveplate, while the contrast plummets with one. Thus, while compensator 206 preferentially provides correction for the LCD errors (~0.02λ's retardance for example), the compensator does not include the typical quarter wave of retardance provided for correcting polarization errors from a polarization prism as was taught by U.S. Pat. No. 5,576,854.

Referring to FIG. 3a, there is shown a side view with projection lens system 150 in greater detail. Referring to FIG. 3b, there is shown a top view of projection lens system 150 with each spatial light modulator 204 mounted within a spatial light modulator assembly 208. Projection lens system 150 comprises a base lens 154, an aperture stop 152, and an anamorphic attachment 156. In the preferred configuration, projection lens system 150 projects the spatial light modulator such that the vertical direction of the LCD modulator is mapped to the vertical direction of the screen in a 1:1 linear manner at some large magnification (500× for example). The anamorphic attachment 156 causes the projection of the horizontal direction of the LCD modulator to be mapped to the screen 140 in a linear manner, but at some ratio other than 1:1. Use of anamorphic attachment 156 allows the projected image to match the aspect ratios of a standard film motion picture film projection format. FIG. 5a illustrates a perspective view of projection lens system 150 having an anamorphic attachment 156. In the arrangement of FIG. 5a, two cylinder lens elements 160 are used to provide a wide field.

The large effective distance in the optical path between spatial light modulator 204 and projection lens system 150 suggests a reverse telephoto lens design, having a long back focal distance. In a preferred embodiment, projection lens system 150 is a reverse telephoto type, having a BFL/EFL ratio of 2.2:1. To maximize light throughput efficiency, the projection lens system 150 of the preferred embodiment has a speed of f/2.3. The lens design is telecentric to control uniformity of contrast ratio and light throughput across the field.

Figure 8:
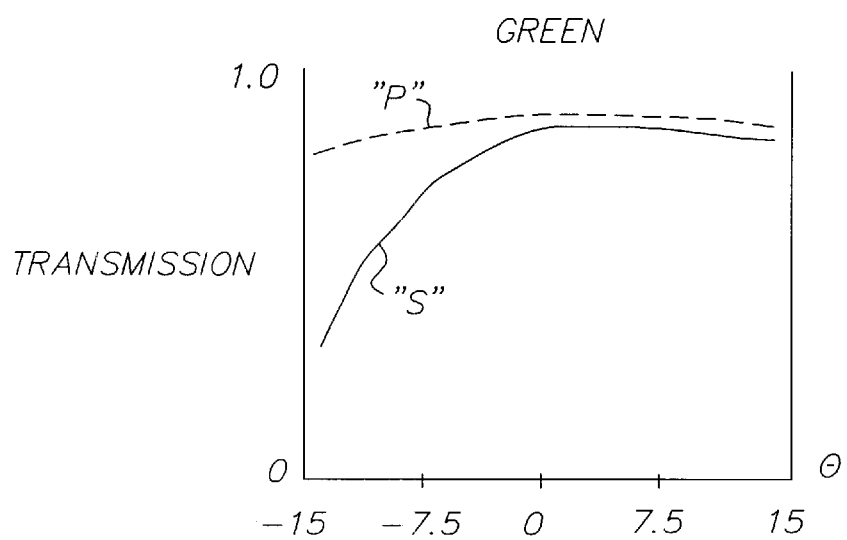
FIG. 8 is a graphic plot showing transmission performance with angular variation for a recombination prism of the present invention.

As shown in FIGS. 1 and 3b, digital cinema projector 100 employs a recombination prism 232 for recombining the modulated R', G', and B' beams preferably using an x-prism configuration. Such prisms are constructed by separately coating the individual inner surfaces to reflect blue or red with high efficiency, while transmitting green with high efficiency. The four individual prisms are then assembled into the larger x-prism with the use of appropriate fixtures and optical adhesive. Of course, x-prisms also have limitations which can affect system performance. For example, as FIG. 8 illustrates, the relative transmission performance of a commercially available X-prism falls off versus incidence angle for the "s" polarized green light. However, this fall-off is polarization dependent, and is less significant for "p" polarized green light. To compensate for this affect, an optional color tuning waveplate 234 may be disposed ahead of recombination prism 232 in the optics path for the green channel, as is shown in FIG. 4. Alternately, the digital cinema projector could be designed around a "Philips" type prism (as disclosed in U.S. Pat. No. 3,202,039 to DeLang et al.), if the performance or packaging designs were superior to that of the x-prism.

Likewise, in the preferred design for digital cinema projector 100, which uses a 1.3" diagonal LCD and fast f/2.3 telecentric light collection at the modulators, recombination prism 232 tends to become very large. For example, an 80 mm square prism was considered, but it proved to be an unreasonable size given cost and delivery constraints. Rather, it was determined that a small amount of off axis designed vignetting, corresponding to a light efficiency loss of a few percent, enabled a design with a much smaller recombination prism 232.

Figure 9A:
FIGS. 9a and 9b are plane views illustrating the principle of squeezing a "flat" 1.85 aspect ratio image onto a 4:3 aspect ratio spatial modulator array.
Figure 9B:
Figure 10A:
FIGS. 10a through 10d are plane views illustrating the principle of squeezing a "scope" image onto a 4:3 ratio aspect ratio spatial modulator array, along with the projected image.

Similarly, other considerations related to available components greatly affect the design of digital projection system 100. As stated previously, projection lens 150 includes anamorphic attachment 156 which maps the modulator array to fill the aspect ratio of the desired film format. Many commercially available modulator arrays, including the JVC QXGA LCDs, have a 4:3 width-to-height format (or 1.33:1). This 4:3 aspect ratio is common to current televisions, computer displays, and many other displays. However, the traditional cinema projection formats in the United States area "flat", with a 1.85:1 aspect ratio, and "cinemascope", with a 2.39:1 aspect ratio. A "Flat" format image 300 (1.85:1) is represented in FIG. 9a and a cinemascope format image 306 (2.39:1), is represented in FIG. 10a. To meet these standards in an optimal manner, spatial light modulator 204 would have an aspect ratio of 2:1, rather than 1.33:1. For such a spatial light modulator 204, projection lens system 150 would be able to provide "letterbox" 1.85:1 flat format image 300 with only small losses in light output and resolution when using only spherical projection optics. Similarly, projection lens system 150 would be able to provide cinemascope format image 306 with slightly larger losses in light output and resolution when using only spherical projection optics. Alternately, spatial light modulator 204 could use devices optimized for HDTV which have a reasonable 1.78:1 aspect ratio, although the resolution of those devices (1920×1080 pixels) would be somewhat below the desired levels. Rather, projection lens 150 was designed with anamorphic attachment 156 which provides a 1.39:1 anamorphic magnification. As shown in FIG. 9b, the image data for a flat image is squeezed to fill the modulator at 1.33:1. When the image is then projected with projection lens 150 with anamorphic attachment 156, a 1.85:1 image results. Otherwise, had the flat image been loaded on the 1.33:1 aspect ratio chip with its native 1.85:1 aspect ratio, ~28% of the available light and pixels would have been lost. Anamorphic attachment 156 can be costly, due to the large size of the lens elements. At the least, such an anamorphic lens assembly would be quite heavy.

Figure 10B:
Figure 10C:
Figure 10D:

Projection of cinemascope format images, however, is more complex. Again, FIG. 10a shows the standard projected cinemascope image at 2.39:1 aspect ratio. As shown in FIG. 10b, the image is actually a squeezed image 308 on the film at 1.2:1 aspect ratio. Conventional film projectors use 2:1 anamorphic lens attachments to unsqueeze the image, providing Cinemascope format image 306. There are several alternatives for handling Cinemascope images in digital cinema with a 4:3 aspect ratio device. The data loading could mimic the film system, underfilling the 1.33:1 aspect ratio modulator array with a squeezed 1.2:1 image. While the loss in resolution and light would be small, anamorphic attachment 156 would have a 2:1 magnification ratio, which would add to the cost and size. Alternately, the cinemascope image data could be squeezed or resized to fill the 1.33:1 aspect ratio image, as shown in FIG. 10c. Squeezed cinemascope image 310 of FIG. 3c would require that anamorphic attachment lens have a 1.79:1 magnification ratio. Although no pixels or light would be lost with this configuration, cinemascope anamorphic attachment 156 would again be large and costly. FIG. 10d illustrates the preferred configuration. In this case, the Cinemascope image is squeezed to underfill the modulator in a letterboxed fashion with to create a 1.72:1 on chip image. In this case, the same 1.39:1 magnification ratio anamorphic attachment 156 used for "flat" format image projection is also used for Cinemascope image projection. Admittedly, 23% of the light and pixels are lost with the compromise for Cinemascope projection, but this trade-off may be the most realistic answer.

There are numerous other projection lens configurations which may be considered. For example, the lens may treat the horizontal image orientation with the spherical elements only, and use the anamorphic elements to correct the image squeezing in the vertical direction. FIG. 5b illustrates a perspective view of an alternative projection lens system 150 design. In this case, projection lens system 150 uses integrated anamorphic attachment 180 having spherical lens elements 162 disposed between cylinder lens elements 160. While this version of projection lens system 150 may be somewhat trickier to produce, the overall lens would be smaller and lighter.

Thus, it can be seen that the design of a digital cinema projector based on reflective LCD modulators involves a complex interaction of the design of the polarization optics, the projection lens, and the method of anamorphically conforming to the common format standards for projected images. The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

For example, modifications to polarization optics could include use of standard polymer sheet polarizers in place of either or both prepolarizer 212 and polarization analyzer 228. This may not be desirable, as polymer polarizers have both less transmission and absorb more light. Again, prepolarizer 212 could also be a polarizing beam splitting cube, but size constraints and limited angular performance make this difficult for a digital cinema system. Prepolarizer 212 could also be a wire grid polarization beamsplitter, preferably used in transmission at 45° incidence. Likewise, while polarization analyzer 228 could be a polarization device other than a wire grid polarizer, the performance requirements and mechanical constraints make this unlikely with the technologies presently available.

Relative to the polarization optics and the design of modulation optical system 200, any changes which improve contrast sufficiently, such that a polarization component can be eliminated are of greatest interest. In particular, if either polarization analyzer 228 or prepolarizer 212 could be eliminated, then nearly 12% light efficiency loss could be removed. However, the image contrast requirements for digital cinema, of 1,000:1 screen contrast, and 2,000:1 contrast from the polarization optics (LCD excluded) make this difficult.

Relative to the preferred system configuration for modulation optical system 200 of FIG. 4, with the light imaged by the projection lens 150 coming from a reflection off of wire grid polarization beamsplitter 224, there is an opportunity to eliminate prepolarizer 212. In this circumstance, the net system polarization contrast is dominated by the contributions of wire grid polarization beamsplitter 224, rather than those of wire grid polarization analyzer 228. Thus, for example, if the polarization contrast for the transmitted "p" light were increased to >3,000:1 across the visible spectrum, then the modulation optical system would have sufficient contrast to function without prepolarizer 212. For example, this could be accomplished with either improved broadband wire grid polarization beamsplitters 224, or with improved color tuned wire grid polarization beamsplitters. Given the performance of today's commercially available devices (see FIG. 7a), this would be a considerable improvement. The performance of modulation optical system 200 could potentially also be improved upon by enhancing the properties of compensator 206 to correct and compensate for secondary effects which degrade the polarization performance of either the spatial light modulator 204 or the wire grid polarization beam splitter 224.

Alternately, wire grid polarization beamsplitter 224 could be optimized to improve upon both the polarization contrast for the transmitted "p" light and the polarization contrast of the reflected "s" polarization light. The overall contrast C, as approximated by, $$C=1/((1/Ct)+(1/Cr))$$

combines both the transmitted and reflected contributions in one term. If, for example, the design of the wire grid polarization beamsplitter 224 was improved from ~40:1 to ~300:1 for "s" red reflection, and also improved from ~1200:1 to ~2,000:1 for "p" red transmission, modulation optical system 200 would again have sufficient contrast to function without prepolarizer 212. Providing improved wire grid devices with this level of performance, as either broadband or color tuned devices, may be more realistic than obtaining 3,000:1 devices. It is known that the performance of wire grid polarization devices can be improved with control of the proper parameters. For example, manufacture of devices with the proper wire pitch or grid spacing (p) between the wires of ~λ/10 instead of the ~λ/5 grid spacing available today would boost contrast ratios significantly. Likewise, simultaneous control of wire thickness and pitch can also boost performance. Furthermore, other design changes to the structure of the wire grid array, such as the methods described in U.S. Pat. No. 6,122,103, or those described in commonly assigned copending U.S. patent application Ser. No. 09/799,281 which modify the wire grid structures in order to boost performance, could also be employed advantageously. Although such improvements could be applied to either the wire grid polarizers (212, 228) or to wire grid polarization beamsplitters 224 in digital cinema projector system 100, improvements in the performance of wire grid polarization beamsplitter 224 would have the greatest impact.

Figure 6:
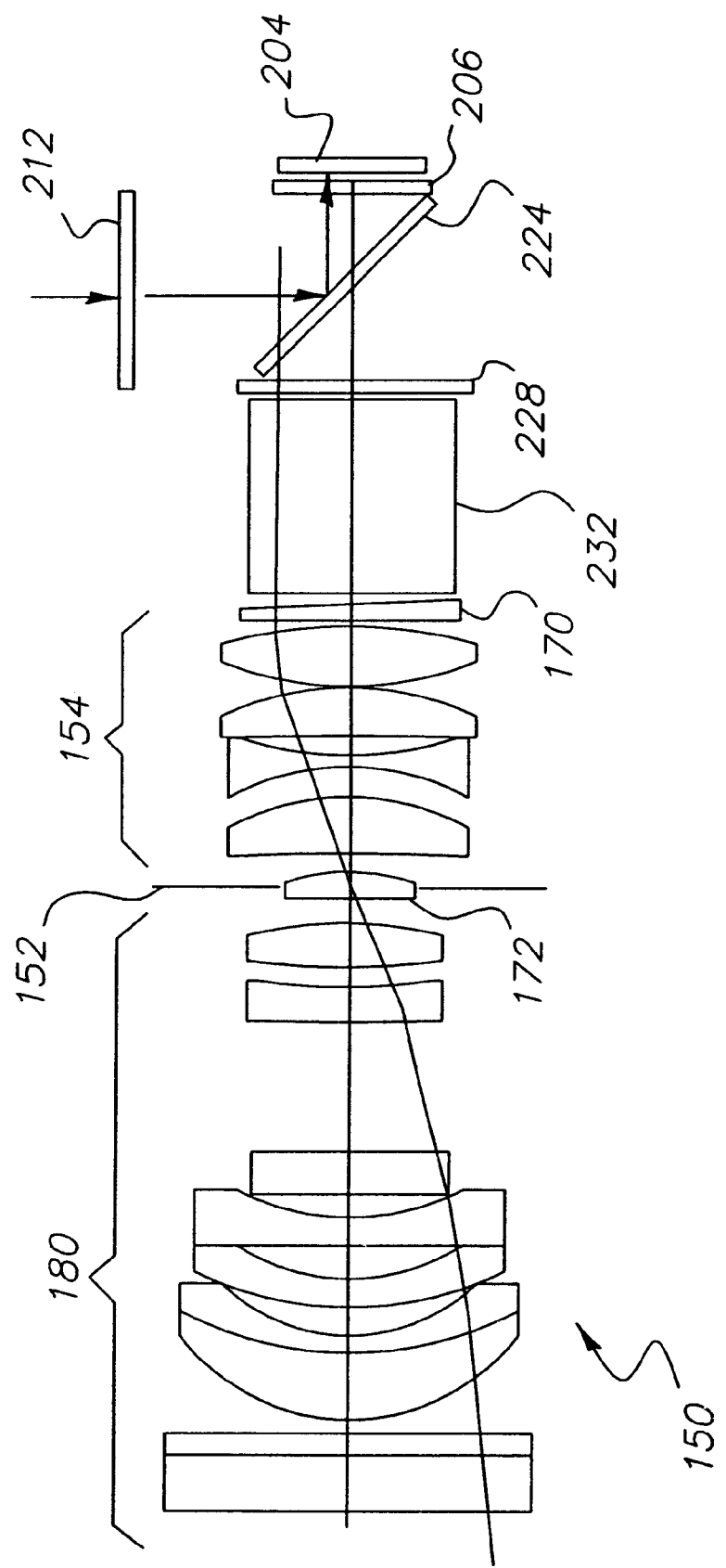
FIG. 6 is a cross-sectional view showing a projection lens system design in an alternate embodiment.

Alternately, digital cinema projection system 100 could be designed with wire grid polarization beamsplitter 224 used to discriminate between modulated and unmodulated light in transmission, rather than in reflection. Such a configuration is shown in FIG. 6, where the incident light reflects off of wire grid polarization beamsplitter 224 and illuminates reflective spatial light modulator 204. The modulated image bearing beam is subsequently transmitted through wire grid polarization beamsplitter 224, and then imaged to the screen by projection lens system 150. This configuration has potential as the contrast ratio for "p" light present for the commercially available wire grid polarization beamsplitters is higher in transmission than in reflection. For example, the improvement is enough to boost the green channel to 500:1 contrast ratio with use of just wire grid polarization analyzer 228 and wire grid polarization beamsplitter 224. Unfortunately, this boost is insufficient with today's commercially available wire grid devices, to allow the system to be configured without an additional polarizer, such as prepolarizer 212. As before, boosting the performance of wire grid polarization beamsplitter 224, either by improving the "p" extinction, or improving both the "p" and the "s" extinctions, could boost the contrast to the required levels for use in digital cinema. Additionally, the configuration of FIG. 6 is complicated by the aberrations (coma and astigmatism) that result from transmission through a tilted plate. If wire grid polarization beamsplitter 224 were mounted on a very thin membrane or within a prism (using optical adhesives or gels), this configuration could be used without incurring the aberrations. Alternately, as shown in FIG. 6, these aberrations can be compensated for with additional components. For example, a cylinder lens 172 can be placed at or near aperture stop 152 to minimize coma. A wedge compensator 170, disposed prior to projection lens system 150, would help to compensate for astigmatism. While it is generally undesirable to add these components to an already complicated system, under the right circumstances, these added components bring modest added complexity to deliver the target contrast ratios.

It should also be noted that the design of modulation optical system 200 can be simplified with the removal of a polarization component, such as prepolarizer 212, if the incoming illuminating light is already polarized. In particular, this could occur if the illumination optical system is designed to utilize some fashion of polarization converter. Many forms of polarization converters are known in the art, including systems with large polarization beam splitting prisms and systems with micro-prism arrays (U.S. Pat. Nos. 5,555,186 and 5,898,521, for example). Polarization converters are used in many LCD projection systems to convert one polarization (for example, "s") of incident light from an unpolarized source (xenon or metal halide lamp) into the other polarization ("p"). Their value is rather limited with sources having a characteristically high LaGrange factor, such as the high wattage (3–5 kW) xenon arc lamps required for digital cinema. A polarization converter can provide >1,000:1 polarization contrast with input collimated light, although the contrast will be significantly reduced with the larger angles generated with beams from large wattage lamps. However, the use of a polarization converter within beam shaping optics 130 of digital cinema projector 100 may allow modulation optical system 200 to be configured without a polarization component, such as prepolarizer 212. This is particularly true if other polarization components, such as wire grid polarization beamsplitter 224, had improved performance relative to the present commercially available products. Additionally, if the polarization converters had better performance with angle than is typically available, modulation optical system 200 could be configured with fewer components. For example, U.S. Pat. No. 6,108,131 describes polarization converters using various configurations of wire grid device with other optics, which may supply the required improved angular performance.

Finally, it is possible to improve the polarization contrast performance of the digital cinema projector 100 by adjusting the angular orientation of wire grid polarization beamsplitter 224, for example to a 35° incidence angle. However, such an arrangement can have adverse side effects, making overall design of digital cinema projector 100 more complex and bulky.

Thus, what is provided is a projector for digital cinema using a wire grid polarization beamsplitter with spatial light modulators to form a projected image on a display screen.

PARTS LIST

100. Digital cinema projector
108. Optional filter
114. Lamphouse
116. Light source
118. Reflector
120. Light integrator
122. Condenser
130. Beam-shaping optics
132. Color-splitting optics
140. Display screen
150. Projection lens system
152. Aperture stop
154. Base lens
156. Anamorphic attachment
160. Cylinder lens element
162. Spherical lens element
170. Wedge compensator
172. Cylinder lens
180. Integrated anamorphic attachment
200. Modulation optical system
204. Spatial light modulator
206. Compensator
208. Spatial light modulator assembly
212. Prepolarizer
224. Wire grid polarization beamsplitter
228. Polarization analyzer
232. Recombination prism
234. Color tuning waveplate
250. Wire grid polarization beamsplitter transmission efficiency curve
252. Wire grid polarization beamsplitter transmitted contrast ratio curve
254. Wire grid polarization beamsplitter reflected contrast ratio curve
256. Wire grid polarizer transmission efficiency curve
258. Wire grid polarizer contrast ratio curve
300. Flat format image
304. Squeezed flat format image
306. Cinemascope format image
308. Cinemascope format film image -continued

PARTS LIST

310. Squeezed cinemascope format image
312. Squeezed cinemascope format image

What is claimed is:

1. A digital cinema projector for projection of color images onto a display surface comprising:
   (a) a light source which produces a beam of light;
   (b) beam shaping optics for homogenizing and focusing said beam of light to provide a homogenized focused light beam;
   (c) color splitting optics for separating said homogenized focused light beam into a plurality of color beams;
   (d) a first modulation optical system for modulating a first color beam to provide an image-bearing first color beam, said first modulation optical system comprising:
      (1) a prepolarizer for prepolarizing said first color beam;
      (2) a wire grid polarization beamsplitter which transmits a first predetermined polarization state of said prepolarized first color beam and reflects remaining portions of said prepolarized first color beam having a second polarization state orthogonal to said first predetermined polarization state and wherein subwavelength wires on said wire grid polarization beamsplitter face a reflective spatial light modulator;
      (3) said reflective spatial light modulator having a plurality of individual elements which alter said predetermined polarization state of said transmitted prepolarized first color beam to provide said image-bearing first color beam, which reflects said image-bearing first color beam off of said wire grid polarization beamsplitter;
      (4) a polarization analyzer which transmits said image-bearing first color beam and attenuates unwanted polarization components of said image-bearing first color beam;
   (e) a recombination prism which combines said image-bearing first color beam from said first modulation optical system with other image-bearing color beams to provide a full-color image-bearing beam; and
   (f) a projection lens system for projecting said full-color image-bearing beam onto said display surface.

2. A digital cinema projector as in claim 1 comprising:
   (g) a second modulation optical system for modulating a second color beam to provide an image-bearing second color beam, said second modulation optical system comprising:
      (1) a prepolarizer for prepolarizing said second color beam;
      (2) a wire grid polarization beamsplitter which transmits said first predetermined polarization state of said second prepolarized second color beam and reflects remaining portions of said prepolarized second color beam having a second polarization state orthogonal to said first predetermined polarization state and wherein subwavelength wires on said wire grid polarization beamsplitter face a reflective spatial light modulator;
      (3) said reflective spatial light modulator having a plurality of individual elements which alter said first polarization state of said transmitted prepolarized second color beam to provide said image-bearing second color beam, which reflect said image-bearing second color beam off of said wire grid polarization beamsplitter; and (4) a polarization analyzer which transmits said image-bearing first color beam and attenuates unwanted polarization components of said image-bearing second color beam.

3. The digital cinema projector of claim 1 wherein said separated color beams comprise red, green, and blue beams.

4. The digital cinema projector of claim 1 wherein said color splitting optics comprise a recombination prism.

5. The digital cinema projector of claim 1 wherein said prepolarizer optics comprise a wire grid polarizer.

6. The digital cinema projector of claim 1 wherein said reflective spatial light modulator comprises a liquid-crystal device.

7. The digital cinema projector of claim 6 wherein said liquid-crystal device employs vertically aligned liquid crystal molecules.

8. The digital cinema projector of claim 1 wherein said projection lens system comprises an integrated anamorphic lens.

9. The digital cinema projector of claim 8 wherein said integrated anamorphic lens comprises a base lens comprising spherical lens elements.

10. The digital cinema projector of claim 9 wherein said anamorphic lens further comprises an anamorphic attachment.

11. The digital cinema projector of claim 10 wherein said anamorphic attachment comprises spherical lens elements.

12. The digital cinema projector of claim 11 wherein said anamorphic attachment further comprises cylindrical lens elements.

13. The digital cinema projector of claim 10 wherein said anamorphic attachment comprises cylindrical lens elements.

14. The digital cinema projector of claim 1 wherein said projection lens system provides anamorphic magnification at 1.39× on the display surface.

15. The digital cinema projector of claim 14 wherein said projection lens system provides anamorphic magnification to provide cinemascopic format on the display surface.

16. The digital cinema projector of claim 1 wherein said modulation optical system further comprises a compensator to correct for residual polarization errors of said spatial light modulator or of said wire grid polarization beamsplitter.

17. The digital cinema projector of claim 1 wherein said modulation optical system further comprises a color-tuning waveplate.

18. The digital cinema projector of claim 1 wherein an aperture of said projection lens system operates at f/2.3 at an object plane which contains said spatial light modulator.

19. The digital cinema projector of claim 1 wherein a half-wave plate is disposed prior to said recombination prism for said green image-bearing color beam.

20. The digital cinema projector of claim 1 wherein said beam-shaping optics comprise an integrating bar.

21. The digital cinema projector of claim 1 wherein image-bearing separated color beams are vignetted by said recombination prism.

22. A digital cinema projector as in claim 1 wherein said wire grid polarization beamsplitter is in a telecentric space.

23. A digital cinema projector as in claim 1 wherein said recombination prism is an x-prism.

24. A digital cinema projector for projecting color images onto a display surface comprising:

(a) a light source which produces a beam of light;
(b) beam shaping optics for homogenizing and focusing said beam of light to provide a homogenized focused light beam;
(c) color splitting optics for separating said homogenized focused light beam into a plurality of color beams;
(d) a plurality of modulation optical systems for modulating each of said color beams to provide image-bearing color beams, each of said modulation optical systems comprising:
  (1) a prepolarization optic for prepolarizing one of said color beams;
  (2) a wire grid polarization beamsplitter which reflects one of said prepolarized color beams having a predetermined polarization state and transmits remaining portions of said prepolarized color beams having an orthogonal polarization state and wherein subwavelength wires on said wire grid polarization beamsplitter face a reflective spatial light modulator;
  (3) said reflective spatial light modulator having a plurality of individual elements which alter said predetermined polarization state of said transmitted prepolarized color beam to provide said image-bearing separated color beam, and which transmits said image-bearing color beam through said wire grid polarization beamsplitter;
  (4) a polarization analyzer which transmits said image-bearing color beam and attenuates unwanted polarization components of said image-bearing color beam;
(e) a recombination prism which combines each of said image-bearing color beams from each of said modulation optical systems to provide a full-color image-bearing beam; and
(f) a projection lens system for projecting said full-color image-bearing beam onto said display surface.

25. The digital cinema projector of claim 24 wherein said separated color beams comprise red, green, and blue beams.

26. The digital cinema projector of claim 24 wherein said projection lens system further comprises a wedge compensator.

27. The digital cinema projector of claim 24 wherein said projection lens system further comprises a cylindrical lens at the stop of said base lens.

28. A method for electronic projection of sequential color image frames onto a display surface for digital cinema comprising:

(a) providing a light source;
(b) focusing and homogenizing light from said light source;
(c) splitting said homogenized focused light beam into a red beam, a green beam, and a blue beam;
(d) modulating each of said red beam, green beam, and blue beam to provide an image-bearing red beam, an image-bearing green beam, and an image-bearing blue beam by:
  (1) prepolarizing each of said red beam, green beam, and blue beam;
  (2) disposing wire grid polarization beamsplitters in front of each of said prepolarized red beam, green beam, and blue beam wherein said wire grid polarization beamsplitters transmit a portion of said prepolarized red beam, green beam, and blue beam having a preferred polarization state and wherein subwavelength wires on said wire grid polarization beamsplitter face a reflective spatial light modulator;
  (3) modulating each of said transmitted red beam, green beam, and blue beam to provide an image-bearing red beam, an image-bearing green beam, and an image-bearing blue beam;

(4) reflecting each of said image-bearing red beam, image-bearing green beam, and image-bearing blue beam off of said wire grid polarization beamsplitter;

(5) analyzing each of said image-bearing red beam, image-bearing green beam, and image-bearing blue beam using a polarization analyzer to attenuate unwanted polarization components;

(e) recombining each said image-bearing red beam, image-bearing green beam, and image-bearing blue beam to provide a full-color image-bearing beam; and (f) projecting said full-color image-bearing beam onto said display surface.

29. The method of claim 28 wherein the step of focusing and homogenizing light from said light source using beam shaping optics comprises the step of using an integrating bar.

30. The method of claim 28 wherein the step of projecting said full-color image-bearing beam comprises the step of anamorphically projecting said full-color image-bearing beam.

31. The method of claim 28 wherein the step of modulating each said transmitted prepolarized red beam, green beam, and blue beam comprises the step of providing a liquid-crystal device as said spatial light modulator.

32. A method for electronic projection of sequential color image frames onto a display surface for digital cinema comprising:

(a) providing a light source;

(b) focusing and homogenizing light from said light source;

(c) splitting said homogenized focused light beam into a red beam, a green beam, and a blue beam;

(d) modulating each of said red beam, green beam, and blue beam;
(1) prepolarizing each of said red beam, green beam, and blue beam to provide a prepolarized red beam, a prepolarized green beam, and a prepolarized blue beam;
(2) disposing wire grid polarization beamsplitters to reflect a portion of said prepolarized red beam, prepolarized green beam, and prepolarized blue beam having a preferred polarization state and wherein subwavelength wires on said wire grid polarization beamsplitter face a reflective spatial light modulator;
(3) modulating each of said preferred prepolarized red beam, green beam, and blue beam using a spatial light modulator to provide an image-bearing red beam, an image-bearing green beam, and an image-bearing blue beam;
(4) transmitting each image-bearing red beam, image-bearing green beam, and image-bearing blue beam through said wire grid polarization beamsplitters;
(5) analyzing said image-bearing red beam, green beam, and blue beam using a polarization analyzer to attenuate unwanted polarization components;

(e) recombining each said image-bearing red beam, green beam, and blue beam to provide a full-color image-bearing beam; and (f) projecting said full-color image-bearing beam onto said display surface with a projection lens system.

33. The method of claim 32 wherein said projection lens system further comprises a wedge compensator and a cylindrical lens at the stop of said projection lens system.

34. A digital cinema projector for projecting color images onto a display surface comprising:

(a) a light source which produces a beam of light;

(b) an optical system which separates said beam of light into separate color beams of light, and which provides beam shaping and focusing for each of said color beams of light;

(c) modulation optical systems for each of said color beams of light, said modulation system comprising:
(1) polarization optics including at least two wire grid polarization devices, where at least one of said wire grid polarization devices is a wire grid polarization beamsplitter, and
(2) a reflective spatial light modulator which alters a polarization state of said color beams of light in a controlled manner with image data;

(d) a recombination prism for combining said separated color beams bearing image data into a full color image-bearing beam;

(e) a projection lens system for projecting said full-color image-bearing beam onto said display surface; and (f) wherein said digital cinema projector provides full color image-bearing beam illumination of said display surface.

35. The digital cinema projector of claim 34 wherein said separated color beams are red, green, and blue respectively.

36. The digital cinema projector of claim 32 wherein said digital cinema projection operates at a color averaged frame sequential contrast >1,000:1.

37. The digital cinema projector of claim 34 wherein said polarization optics comprise a wire grid polarizer to prepolarize each of said color beams of light; a wire grid polarization beamsplitter used in transmission during illumination of said spatial light modulator array with said color beam of light, and then used in reflection for separating said color beams of light bearing image data; and a wire grid polarizer to analyze said color beams of light.

38. The digital cinema projector of claim 34 wherein said polarization optics comprise a wire grid polarizer to prepolarize each of said color beams of light; a wire grid polarization beamsplitter used in reflection during illumination of said spatial light modulator array with said color beam of light, and then used in transmission for separating said color beams of light bearing image data; and a wire grid polarizer to analyze said color beams of light.

39. An electronic projection apparatus for projection of color images onto a display surface, said apparatus comprising:

(a) a light source which produces a beam of light;

(b) an optical system which separates said beam of light into separate color beams of light, and which provides beam shaping and focusing of said color beams of light;

(c) a modulation optical system for each of said color beams of light, said modulation system comprising:
(1) polarization optics including at least two wire grid polarization devices, where at least one of said wire grid polarization devices is a wire grid polarization beamsplitter and wherein subwavelength wires on said wire grid polarization beamsplitter face a reflective spatial light modulator; and
(2) said reflective spatial light modulator which alters a polarization state of said color beams of light in a controlled manner with image data;

(d) a recombination prism for combining said separated color beams bearing image data into a full color image bearing beam; and (e) a projection lens system for projecting said full-color image-bearing beam onto said display surface.

40. A digital cinema projector for projection of color images onto a display surface comprising:
  (a) a light source which produces a beam of light;
  (b) beam shaping optics for homogenizing and focusing said beam of light to provide a homogenized focused light beam;
  (c) color splitting optics for separating said homogenized focused light beam into a plurality of color beams;
  (d) a first modulation optical system for modulating a first color beam to provide an image-bearing first color beam, said first modulation optical system comprising:
    (1) a prepolarizer for prepolarizing said first color beam;
    (2) a wire grid polarization beamsplitter which transmits a first predetermined polarization state of said prepolarized first color beam and reflects remaining portions of said prepolarized first color beam having a second polarization state orthogonal to said first predetermined polarization state and wherein subwavelength wires on said wire grid polarization beamsplitter face a reflective spatial light modulator;
    (3) said reflective spatial light modulator having a plurality of individual elements which alter said predetermined polarization state of said transmitted prepolarized first color beam to provide said image-bearing first color beam, which reflects said image-bearing first color beam off of said wire grid polarization beamsplitter;
    (4) a polarization analyzer which transmits said image-bearing first color beam and attenuates unwanted polarization components of said image-bearing first color beam;
  (e) a recombination prism which combines said image-bearing first color beam from said first modulation optical system with other image-bearing color beams to provide a full-color image-bearing beam;
  (f) a projection lens system for projecting said full-color image-bearing beam onto said display surface; and
  (g) wherein said wire grid polarization beamsplitter is in a telecentric space.

41. An electronic projection apparatus for projection of color images onto a display surface comprising:
  (a) a light source which produces a beam of light;
  (b) beam shaping optics for homogenizing and focusing said beam of light to provide a homogenized focused light beam;
  (c) color splitting optics for separating said homogenized focused light beam into a plurality of color beams;
  (d) a first modulation optical system for modulating a first color beam to provide an image-bearing first color beam, said first modulation optical system comprising:
    (1) a prepolarizer for prepolarizing said first color beam;
    (2) a wire grid polarization beamsplitter which transmits a first predetermined polarization state of said prepolarized first color beam and reflects remaining portions of said prepolarized first color beam having a second polarization state orthogonal to said first predetermined polarization state;
    (3) a reflective spatial light modulator having a plurality of individual elements which alter said predetermined polarization state of said transmitted prepolarized first color beam to provide said image-bearing first color beam, which reflects said image-bearing first color beam off of said wire grid polarization beamsplitter;
    (4) a polarization analyzer which transmits said image-bearing first color beam and attenuates unwanted polarization components of said image-bearing first color beam;
  (e) a recombination prism which combines said image-bearing first color beam from said first modulation optical system with other image-bearing color beams to provide a full-color image-bearing beam; and
  (f) a projection lens system for projecting said full-color image-bearing beam onto said display surface.

42. A modulation optical system for providing high contrast modulation of an incident light beam, comprising:
  (a) a prepolarizer for prepolarizing said beam of light to provide a polarized beam of light;
  (b) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;
  (c) wherein said reflective spatial light modulator selectively modulates said polarized beam of light having a first polarization to encode data thereon to form a modulated beam, and for reflecting said modulated beam back to said wire grid polarization beamsplitter; and
  (d) a polarization analyzer which receives said modulated light, and which further removes any residual unmodulated light from said modulated light.

43. A modulation optical system as in claim 42 wherein said modulator is a liquid crystal device.

44. A modulation optical system as in claim 43 wherein said liquid crystal display device is comprised of vertically aligned liquid crystal molecules.

45. A modulation optical system as in claim 42 wherein said prepolarizer comprises a wire grid polarizer.

46. A modulation optical system as in claim 42 wherein said polarization analyzer comprises a wire grid polarizer.

47. A modulation optical system for providing high contrast modulation of an incident light beam comprising:
  (a) a prepolarizer for pre-polarizing said beam of light to provide a polarized beam of light;
  (b) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;
  (c) wherein said reflective spatial light modulator receives said polarized beam of light, having either a first polarization or a second polarization, and selectively modulates said polarized beam of light to encode data thereon, providing both modulated light and unmodulated light which differ in polarization;
  (d) wherein said reflective spatial light modulator reflects back both said modulated light and said unmodulated light to said wire grid polarization beamsplitter;

(e) wherein said wire grid polarization beamsplitter separates said modulated light from said unmodulated light; and (f) a polarization analyzer receives said modulated light, and which further removes any residual unmodulated light from said modulated light.

48. A modulation optical system as in claim 47 wherein said modulator is a liquid crystal display device.

49. A modulation optical system as in claim 48 wherein said liquid crystal display device is comprised of vertically aligned liquid crystal molecules.

50. A modulation optical system as in claim 47 wherein said prepolarizer comprises a wire grid polarizer.

51. A modulation optical system as in claim 47 wherein said polarization analyzer comprises a wire grid polarizer.

52. A modulation optical system as in claim 47 wherein said reflective spatial light modulator receives said polarized beam of light having a first polarization state transmitted through said wire grid polarization beamsplitter.

53. A modulation optical system as in claim 47 wherein said reflective spatial light modulator receives said polarized beam of light having a second polarization state reflected from said wire grid polarization beamsplitter.

* * * * *